(12) United States Patent
Cowles et al.

(10) Patent No.: US 9,407,074 B2
(45) Date of Patent: Aug. 2, 2016

(54) MOUNT ASSEMBLY

(75) Inventors: William Cowles, Brooklyn, NY (US);
Wendy Feldstein, Old Tappan, NJ (US);
George Feldstein, Cresskill, NJ (US);
Thomas Mans, Harrington Park, NJ (US)

(73) Assignee: CRESTON ELECTRONICS, INC., Rockleigh, NJ (US)

( * ) Notice: Subject to any disclaimer, the term of this patent is extended or adjusted under 35 U.S.C. 154(b) by 565 days.

(21) Appl. No.: 13/486,667

(22) Filed: Jun. 1, 2012

(65) Prior Publication Data
US 2013/0319752 A1    Dec. 5, 2013

(51) Int. Cl.
| | |
|---|---|
| H02G 3/08 | (2006.01) |
| H02G 3/12 | (2006.01) |
| H02G 3/20 | (2006.01) |
| F21V 21/04 | (2006.01) |

(52) U.S. Cl.
CPC ............... *H02G 3/123* (2013.01); *F21V 21/04* (2013.01); *H02G 3/20* (2013.01); *H04R 2201/021* (2013.01); *Y10T 29/49124* (2015.01)

(58) Field of Classification Search
CPC .......... F21V 21/00; H02G 3/123; H02G 3/20; H04R 1/02; H04R 2201/02
USPC .......................................... 174/491, 480, 481
See application file for complete search history.

(56) References Cited

U.S. PATENT DOCUMENTS

| | | | | |
|---|---|---|---|---|
| 4,887,073 | A * | 12/1989 | Nakao | G08B 17/00 340/628 |
| 6,377,182 | B1 | 4/2002 | Devine | |
| 7,335,886 | B2 | 2/2008 | Eskildsen | |
| 7,628,366 | B2 | 12/2009 | Scott | |
| 8,544,807 | B2 * | 10/2013 | Foreman | G08B 13/19619 248/222.11 |
| 2003/0223240 | A1 * | 12/2003 | Houle | F21V 21/04 362/364 |
| 2006/0237651 | A1 * | 10/2006 | Eskildsen | G08B 13/19 250/342 |
| 2006/0256452 | A1 * | 11/2006 | Lung | G08B 13/193 359/742 |
| 2012/0327242 | A1 * | 12/2012 | Barley | H04N 5/232 348/155 |

* cited by examiner

*Primary Examiner* — Timothy Thompson
*Assistant Examiner* — Paul McGee, III
(74) *Attorney, Agent, or Firm* — Creston Electronics, Inc

(57) ABSTRACT

A mounting assembly is configured for mounting electronics in a ceiling or wall without requiring access to interior portions of the ceiling or wall. The mounting assembly comprises a collar, at least two arms and at least two threaded screws. The collar fits around and attaches to the electronics housing. The at least two arms are each independently compressed to engage the ceiling and are coupled to the collar to support the collar in the ceiling.

20 Claims, 12 Drawing Sheets

MOUNT ASSEMBLY

BACKGROUND OF THE INVENTION

1. Technical Field

The present invention relates to mounting hardware and more specifically hardware for mounting devices flush to a surface.

2. Background Art

Various electronic devices are commonly distributed throughout a building. Most commonly, lights are mounted in ceilings and walls of most buildings. Additionally, various sensors to measure occupancy or environmental conditions. Speakers and other AV equipment may be mounted as well. As homes and offices become increasingly smarter, the number and type of electronics mounted in walls and ceilings is expected to increase as well.

A mount assembly is required to support the load of the electronics in the wall. Preferably this mount must also provide access for operation or modification. Two common mounting methods include surface mounting and internal mounting. Surface mounting is a method in which the electronics are mounted to the exterior surface of the ceiling and internal mounting is a method in which the electronic device is inserted into the ceiling. There are several deficiencies associated with both methods.

Surface mounts, while generally easy to install, are aesthetically unappealing for most applications. Because the electronics are mounted on the outside of the wall, they leave a non-uniform surface on the ceiling.

Internal mounts, also known as high-hat mounts, while more aesthetically pleasing, are generally not suitable to support heavy electronic devices. Additionally, these mounts are typically difficult to install and often require additional mounting hardware such as screws and brackets. Additionally, many mounts are not adaptable to ceilings of different width or ceilings with non-uniform width.

There is now a need for improved mounting hardware for internally mounting electronics that provides enough mechanical resistance to support more robust electronics and is easy to install and adaptable to differing ceiling configurations.

SUMMARY OF THE INVENTION

It is to be understood that both the general and detailed descriptions that follow are exemplary and explanatory only and are not restrictive of the invention.

DISCLOSURE OF INVENTION

Principles of the invention provide systems, devices and methods for mounting electronics in a ceiling. For example, according to a first aspect, the present invention provides a mount assembly comprising a collar dimensioned to fit around and configured for detachably connecting to a housing, at least two arms coupled to the housing at a hinge and configured for being compressibly engaged with an inner surface of a planar board and at least two threaded screws. Each arm further comprises a first portion further comprising a threaded insert extending from a top surface of the first portion to a bottom portion of the first portion, a second portion meeting the first portion at a hinge, and a third portion meeting the second portion at a hinge. The body of each screw is configured for extending through a corresponding threaded insert of one of the at least two arms.

According to a second aspect, the present invention provides a system for mounting electronics in a wall. The system comprises an electronics housing, a collar, at least two arms and at least two threaded screws. The collar is dimensioned to fit around the electronics housing and configured for detachably connecting to the electronics housing. The at least two arms are coupled to the collar at a hinge and configured for supporting the collar in the wall by being compressibly engaged with an inner surface of the wall. Each of the at least two arms comprise a first portion further comprising a threaded insert extending from a top surface of the first portion to a bottom portion of the first portion, a second portion meeting the first portion at a hinge and a third portion meeting the second portion at a hinge. The body of each screw is configured for extending through a corresponding threaded insert of one of the at least two arms.

According to a third aspect, the present invention provides a system for mounting a passive infrared (PIR) sensor in a ceiling. The system comprises a PIR sensor, a cylindrical collar, three arms, three threaded screws, a Fresnel lens and a cap. The PIR sensor comprises a cylindrical housing with a flange extending from the bottom of the housing and a tab disposed in a cutout of an outer peripheral wall of the housing. The flange further comprises three holes extending from a top surface of the flange to a bottom surface of the flange. The cylindrical collar is dimensioned to fit around the sensor housing and comprises three holes axially aligned with the holes of the sensor housing and extending from a top surface of the collar to a bottom surface of the collar, a slot for communicating with the tabs of the sensor housing and detachably connecting the sensor housing to the collar and a flange extending from the bottom of the collar comprising a top surface for communicating with an exterior surface of the ceiling and a bottom surface for communicating with a top surface of the electronics housing flange. The three arms are coupled to the collar at a hinge and configured for supporting the collar in the wall by being compressibly engaged with an interior peripheral surface of the opening in the wall. Each of the three arms comprises a first portion further comprising a threaded insert extending from a top surface of the first portion to a bottom portion of the first portion and axially aligned with a corresponding one of the three holes of the collar, a second portion meeting the first portion at a hinge and a third portion meeting the second portion at a hinge. The body of each screw is configured for extending through a corresponding threaded insert of one of the three arms and a corresponding one of the three holes of the collar. The cap is configured for supporting the Fresnel lens in space and comprises an annular disc with a ridge and three tabs. Each of the three tabs is configured for communicating with one of the slots formed between each tab and cutout of the electronics housing.

According to a fourth aspect, the present invention provides a method for mounting electronics in a planar board comprising the steps of inserting a first threaded screw through a first hole in a collar and a first threaded insert in a first arm coupled to the collar, inserting at least a second threaded screw in a second hole in the collar and a second threaded insert in a second arm coupled to the collar, detachably connecting a housing to the collar by inserting the housing in the collar, inserting a collar in an opening of the planar board, engaging an inner surface of the planar board by compressing the first arm to a first desired arm angle by rotating the first threaded screw, and engaging an inner surface of the planar board by compressing at least the second arm to a second desired arm angle by rotating the second threaded screw.

The present invention seeks to overcome or at least ameliorate one or more of several problems, including but not limited to the need for installers to access both sides of a ceiling to mount electronics.

BRIEF DESCRIPTION OF DRAWINGS

The accompanying figures further illustrate the present invention.

The components in the drawings are not necessarily drawn to scale, emphasis instead being placed upon clearly illustrating the principles of the present invention. In the drawings, like reference numerals designate corresponding parts throughout the several views.

BRIEF DESCRIPTION OF THE SEVERAL VIEWS OF THE DRAWING

Figure 1:
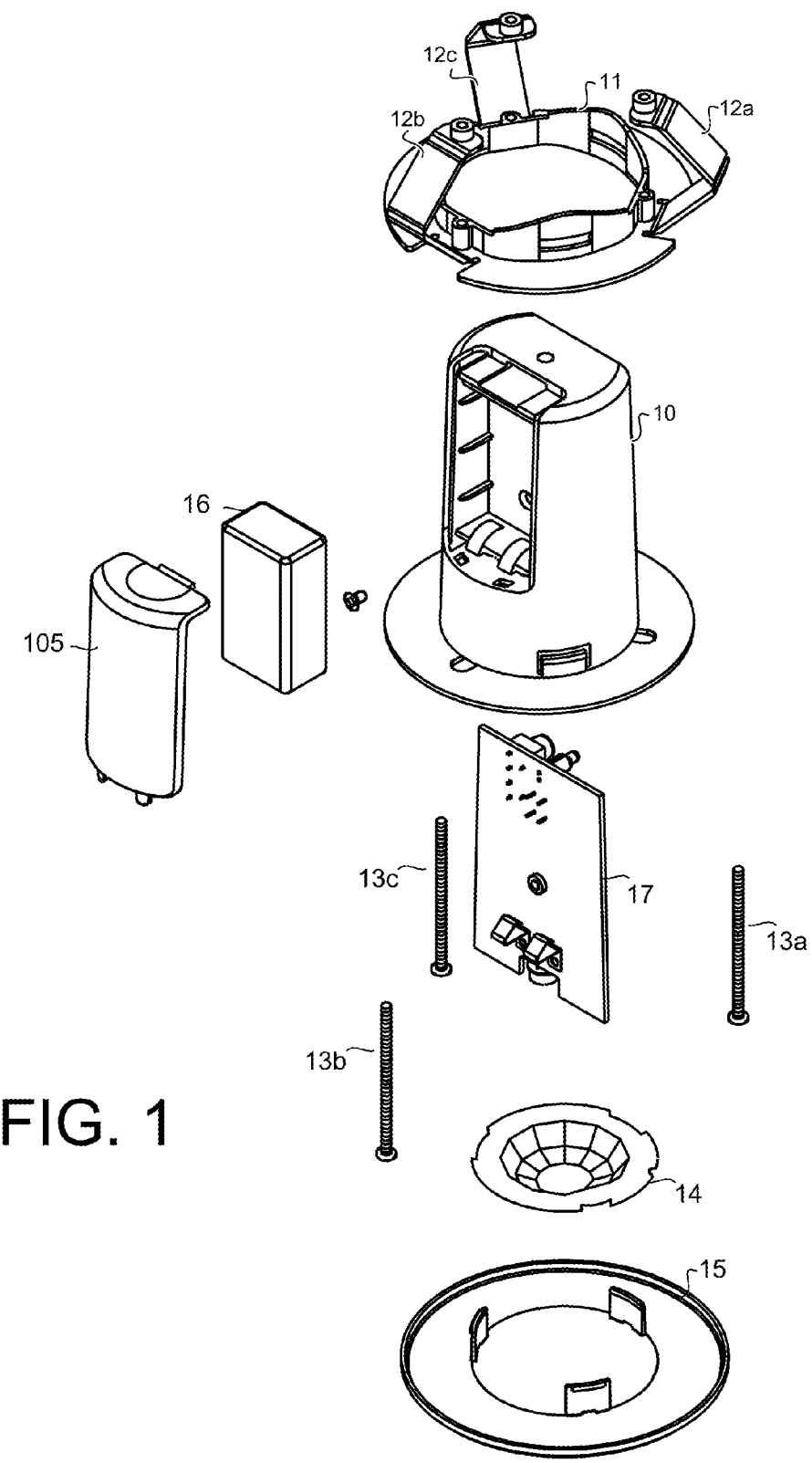

FIG. 1 is an exploded diagram of a system for mounting electronics, according to an illustrative embodiment of the invention.

Figure 2:
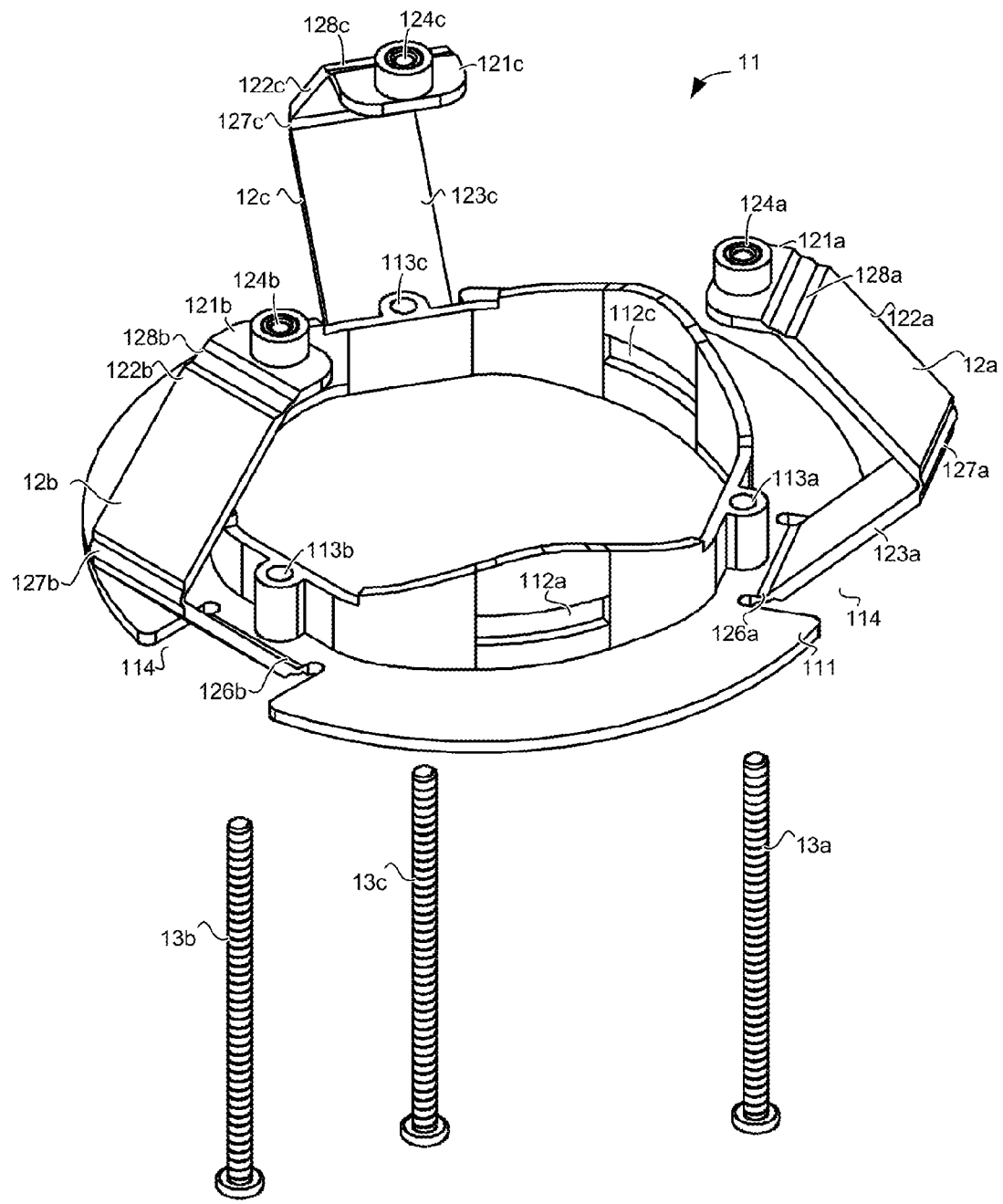

FIG. 2 shows a mount assembly of the system for mounting electronics shown in FIG. 1, according to an illustrative embodiment of the invention.

Figure 3:
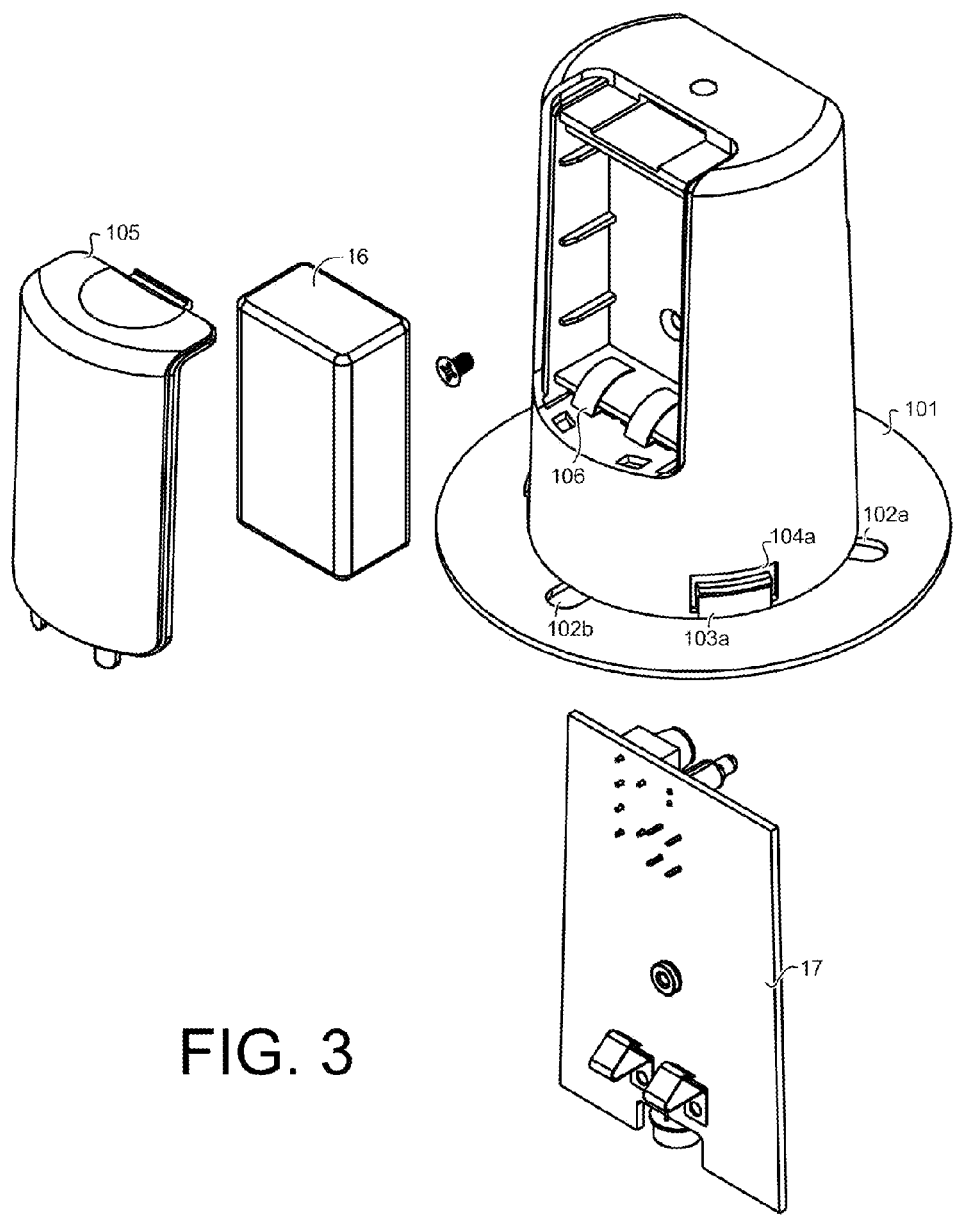

FIG. 3 shows an electronics housing of the system for mounting electronics shown in FIG. 1, according to an illustrative embodiment of the invention.

Figure 4:
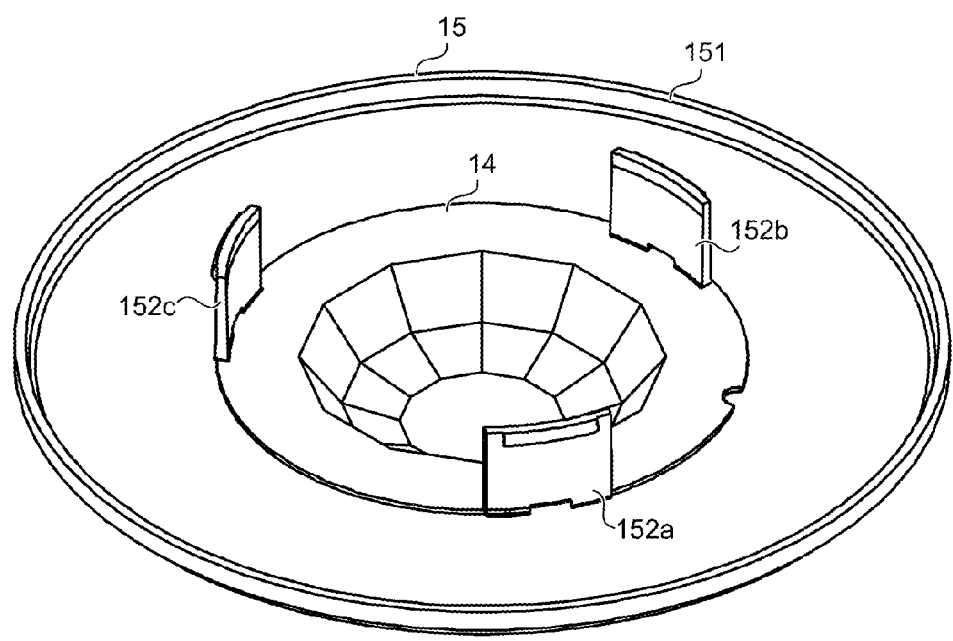

FIG. 4 shows a cap and lens of the system for mounting electronics shown in FIG. 1, according to an illustrative embodiment of the invention.

Figure 5A:
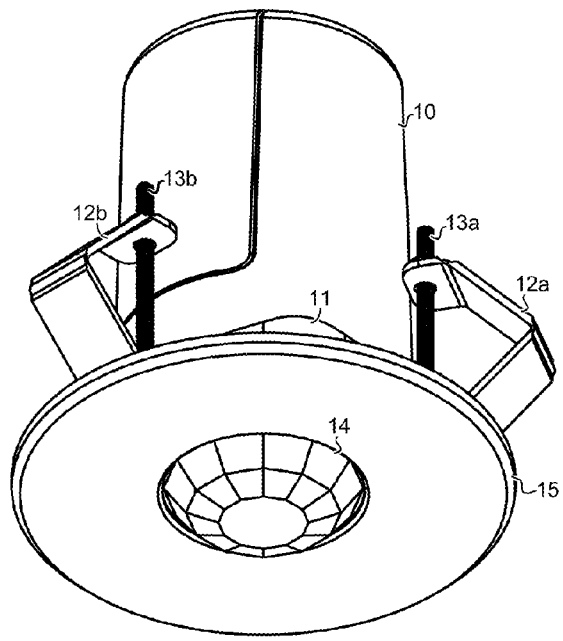

FIG. 5a is a bottom view of the system for mounting electronics in an assembled configuration, according to an illustrative embodiment of the invention.

Figure 5B:
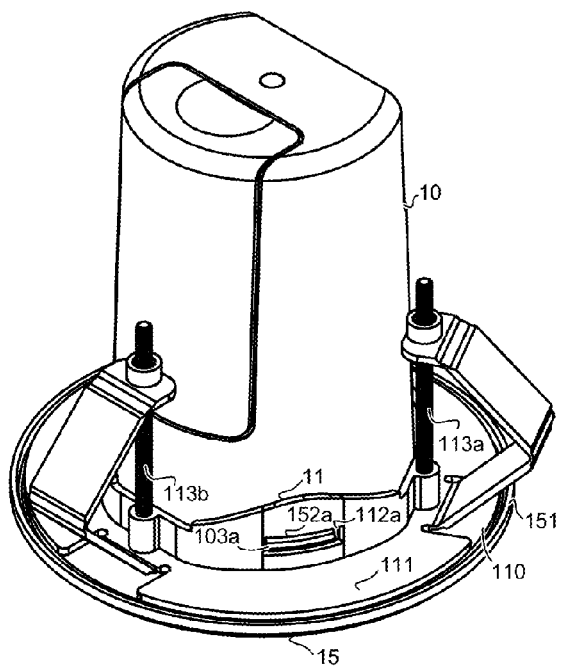

FIG. 5b is a top view of the system for mounting electronics in an assembled configuration, according to an illustrative embodiment of the invention.

Figure 6:
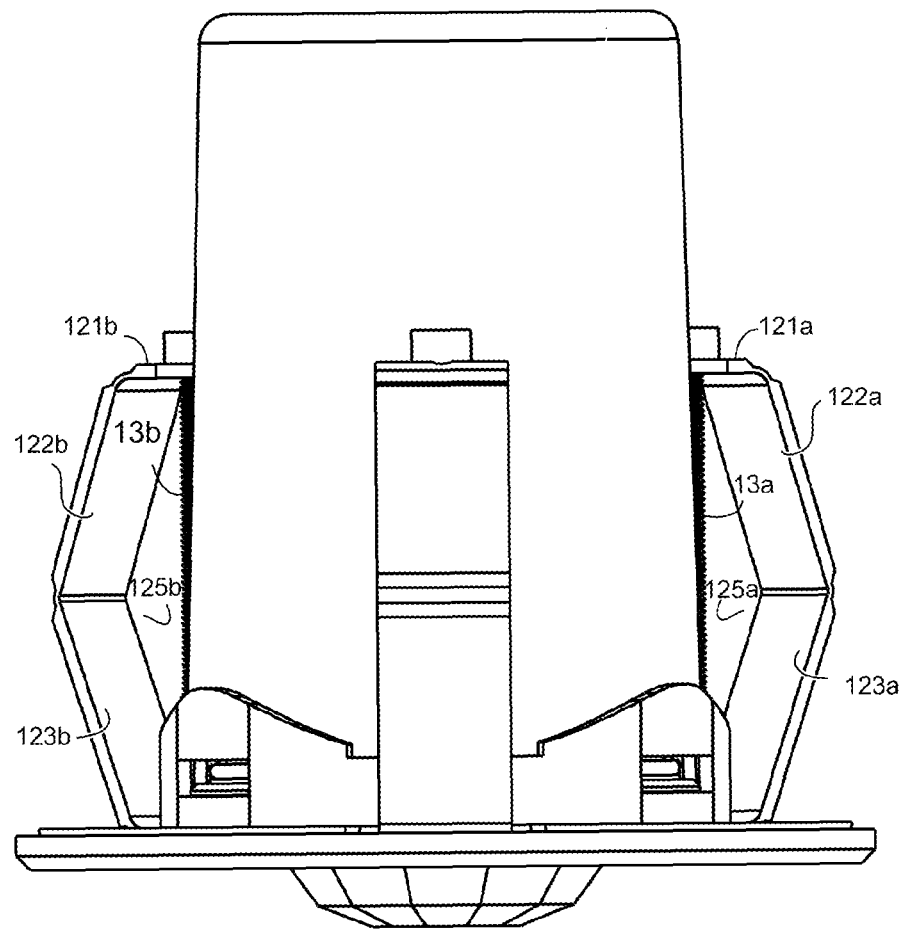

FIG. 6 shows the assembled system for mounting electronics in an open position, according to an illustrative embodiment of the invention.

Figure 7:
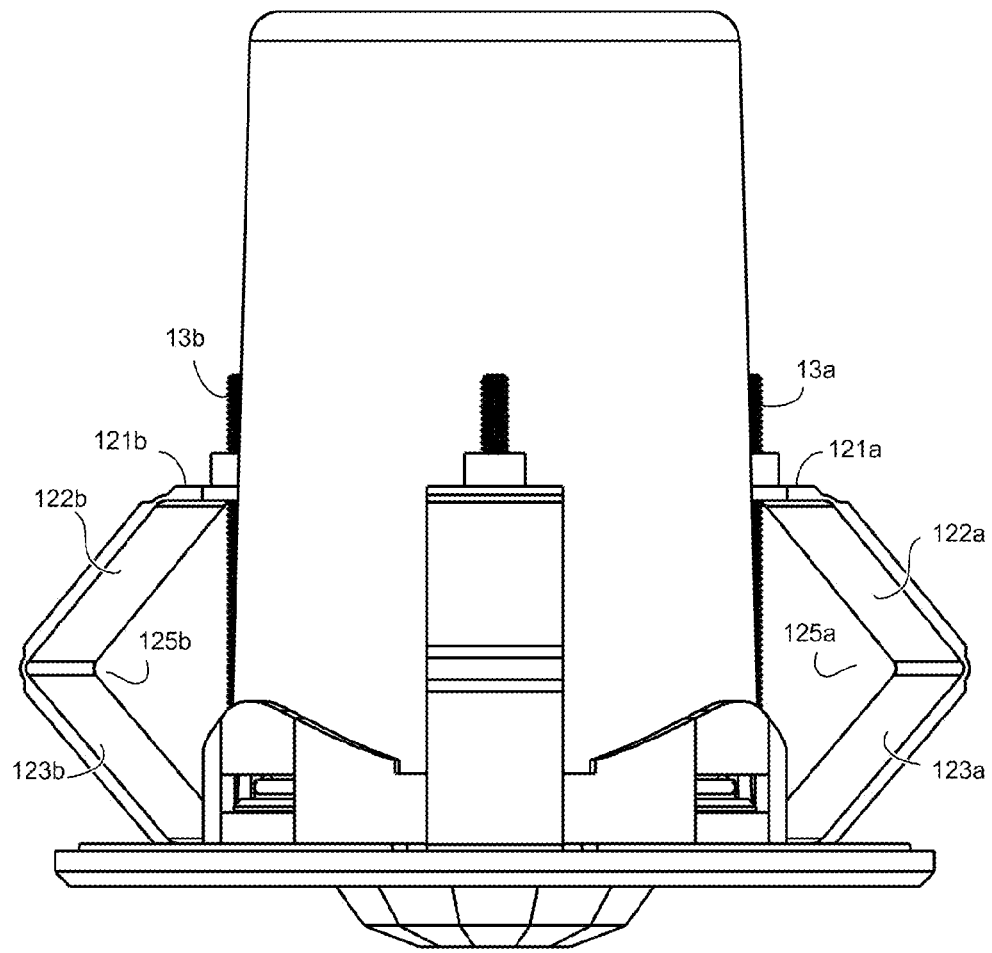

FIG. 7 shows the assembled system for mounting electronics in a partially closed position, according to an illustrative embodiment of the invention.

Figure 8:
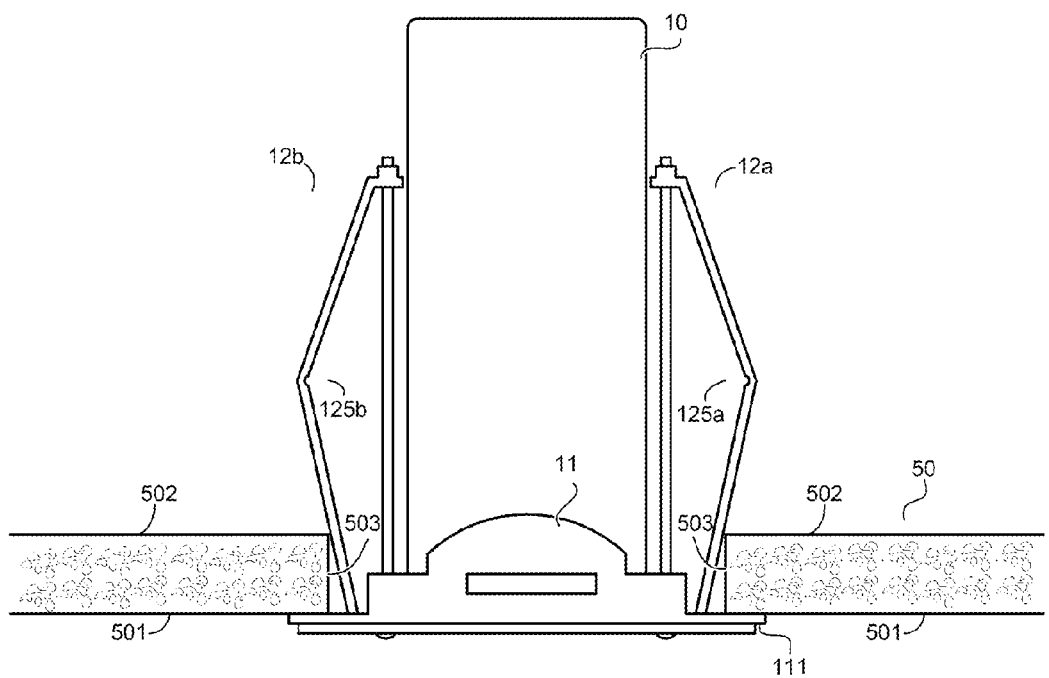

FIG. 8 is a side view the assembled system for mounting electronics installed in a ceiling, according to an illustrative embodiment of the invention.

Figure 9:
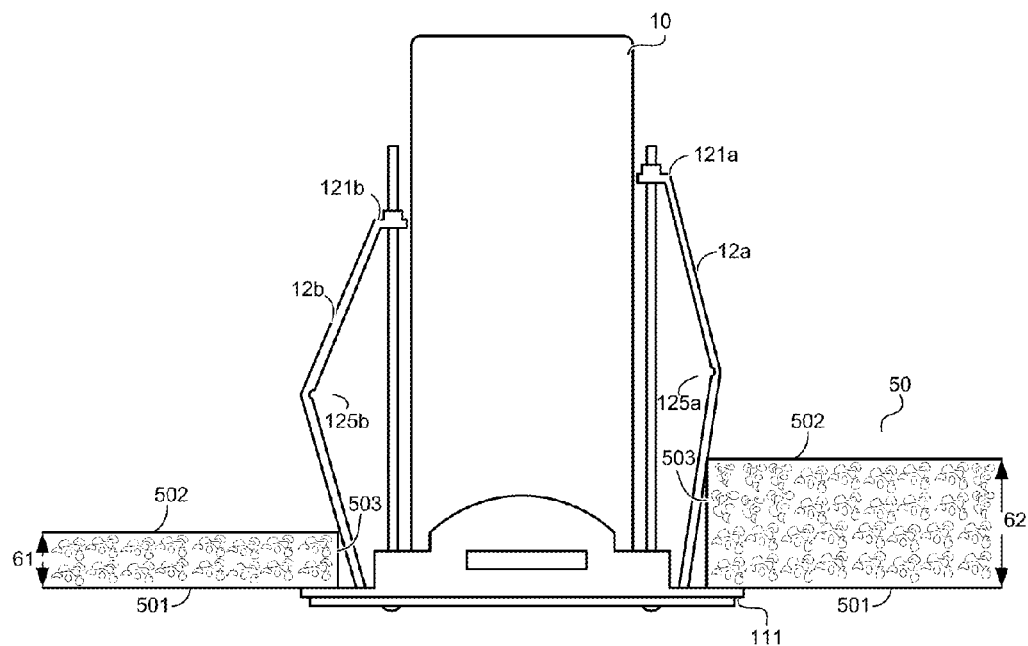

FIG. 9 is a side view of the assembled system for mounting electronics installed in a ceiling with variable width, according to an illustrative embodiment of the invention.

Figure 10:
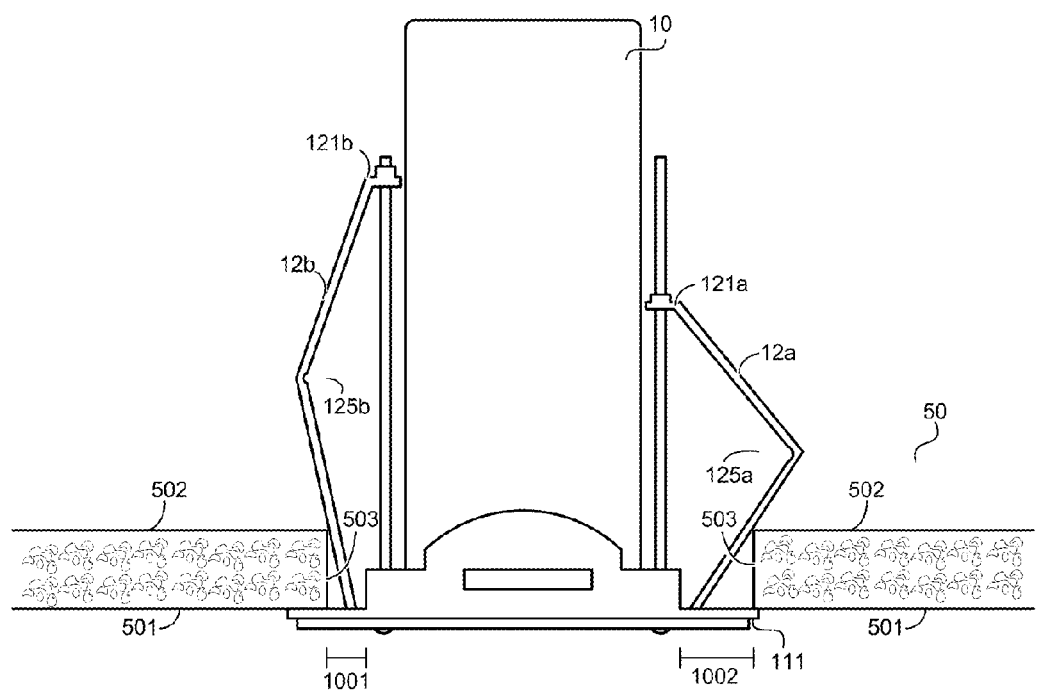

FIG. 10 is a side view of the assembled system for mounting electronics installed in a ceiling with an irregular opening, according to an embodiment of the invention.

Figure 11:
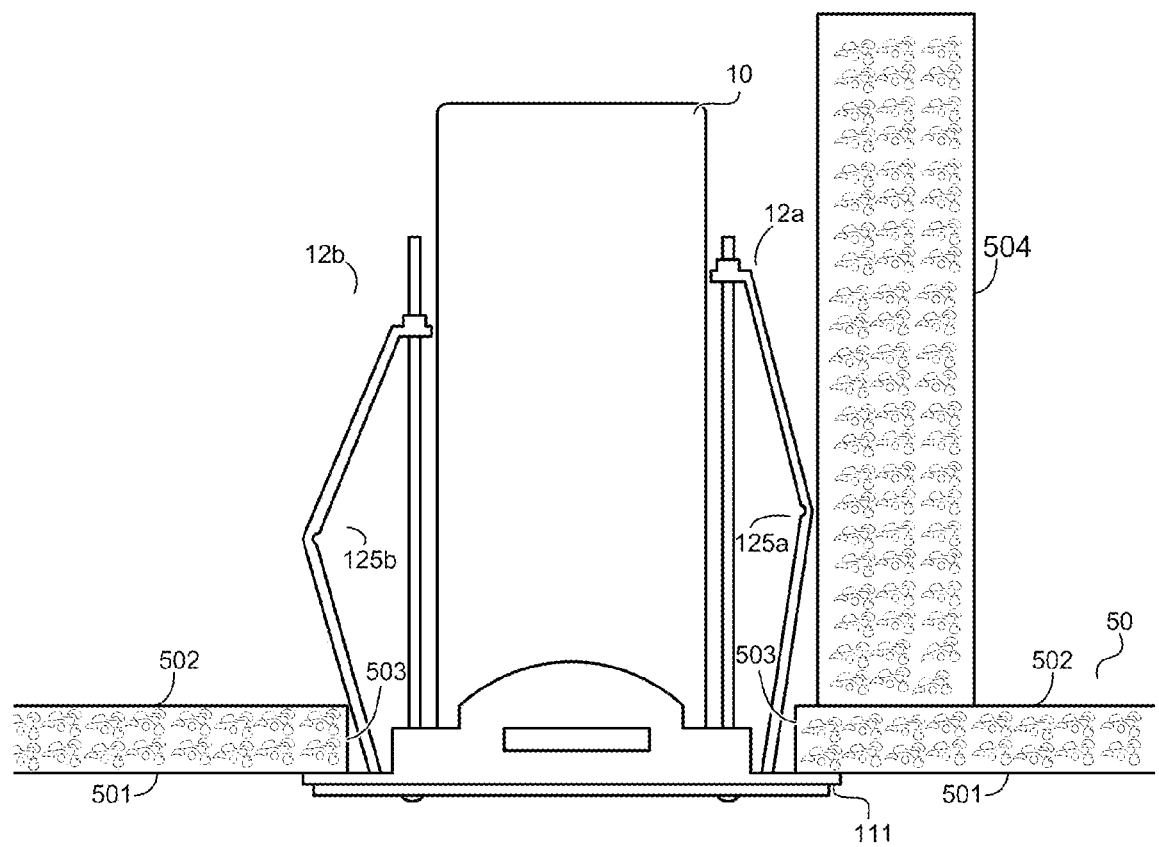

FIG. 11 is a side view of the assembled system for mounting electronics installed in a ceiling with a nearby wall joist, according to an illustrative embodiment of the invention.

Figure 12:
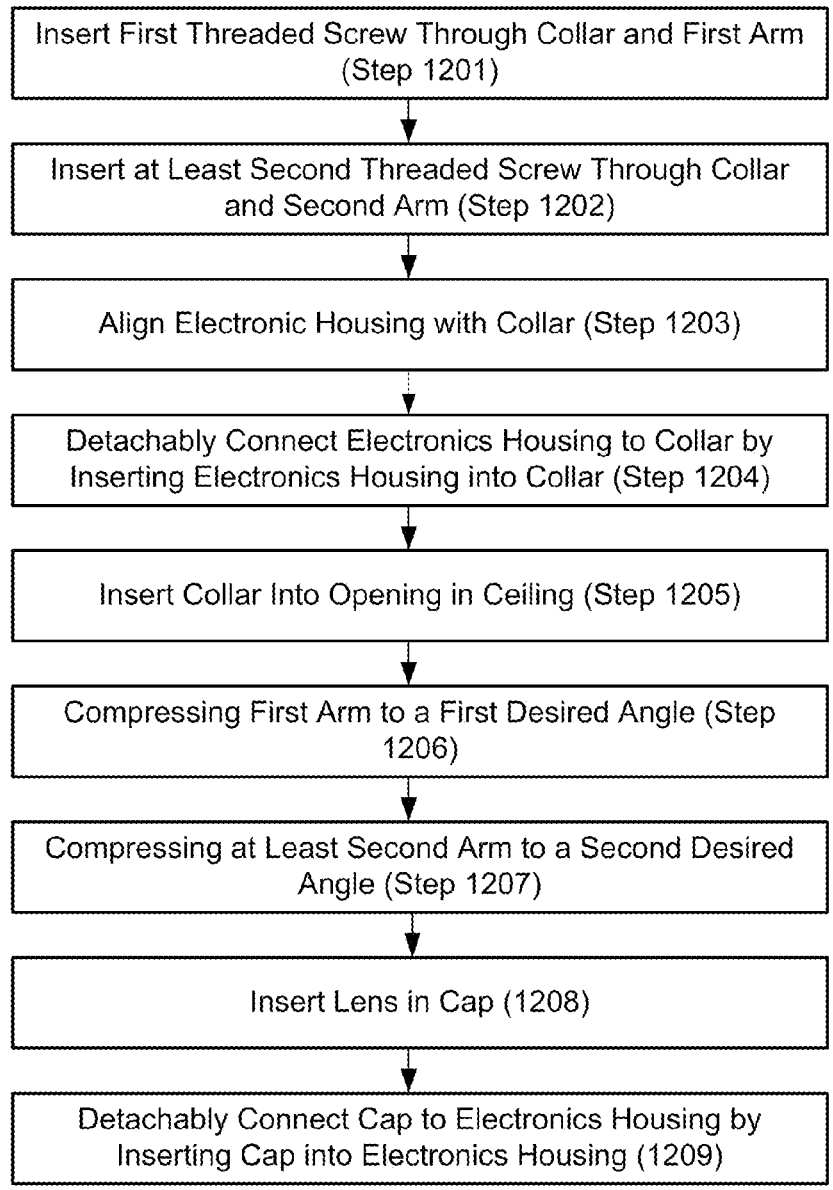

FIG. 12 is a flowchart illustrating a method for mounting electronics in a planar board, according to an embodiment of the invention.

LIST OF REFERENCE NUMBERS FOR THE MAJOR ELEMENTS IN THE DRAWING

The following is a list of the major elements in the drawings in numerical order.
10 electronics housing
11 collar
12a-c arm
13a-c threaded screw
14 Fresnel lens
15 cap
16 battery
17 PIR sensor
50 ceiling
61 first width
62 second width
101 housing flange
102a-c hole
103a-c tab
104 cutout
105 battery cover
106 electrical connection
107 battery compartment
111 collar flange
112a-c slot
113a-c hole
114a-c indentation
121a-c first portion
122a-c second portion
123a-c third portion
124a-c threaded insert
125a-c arm angle
126a-c hinge
127a-c hinge
128a-c hinge
151 rim
152a-c tab
501 exterior surface
502 interior surface
503 peripheral surface
504 beam
1001 length between first arm and peripheral surface
1002 length between second arm and peripheral surface
1201 (step of) inserting first threaded screw through collar and arm
1202 (step of) inserting second threaded screw through collar and arm
1203 (step of) aligning electronic housing with collar
1204 (step of) detachably connecting electronics housing to collar
1205 (step of) inserting collar in opening in ceiling
1206 (step of) compressing first arm to a first desired angle
1207 (step of) compressing second arm to a second desired angle
1208 (step of) inserting a lens filter in a cap
1209 (step of) detachably connecting cap to electronics housing

DETAILED DESCRIPTION OF THE INVENTION

The present invention provides a mount assembly. More particularly, the present invention provides a mount assembly accessible from an exterior surface of a ceiling or wall and which requires no access to areas behind the external surface. At least two independently controlled arms support the assembly in the wall or ceiling. Individual components of the mount assembly snap in place for simple hardware-free assembly.

Throughout the specification, the mount assembly is described in the context of mounting a passive infrared (PIR) sensor in a ceiling. However, the present invention should not be limited to mounting PIR sensors. In another example, the mounted electronic device may be a wireless gateway for wireless communication on a network. In yet another example, the electronic device may be a speaker. It is contemplated that the mount assembly may mount non-electronic devices as well. For example, the mount assembly may be employed to mount decorative or functional structures in a wall.

Similarly, the mount assembly is not limited to use with a ceiling. The mount may be used to mount a device in any planar board. For example, the planar board may be a portion of a ceiling, floor, wall, table top, desk top or wooden beam. Additionally, the planar board is not limited to a certain material. The planar board may be comprise a panel sheetrock, or plaster.

FIG. 1 is an exploded diagram of a system for mounting electronics in a wall, according to an illustrative embodiment of the invention. The system comprises an electronics housing 10 and a mount assembly further comprising a collar 11, a first arm 12a, a second arm 12b, a third arm 12c, a first threaded screw 13a, a second threaded screw 13b, and a third threaded screw 13c. The mount assembly and electronics housing 10 are inserted into an opening in a ceiling and supported in space by the three arms 12a-c engaging an inner surface of the wall, such as an interior peripheral surface of the opening or the interior surface of the ceiling.

While the mount assembly in the embodiment shown in FIG. 1 comprises three arms, the present invention should not be limited to three arms. Embodiments comprising two arms and greater than three arms fall within the scope of the invention. As will described below, the number of certain elements of the system are dependent on the number of arms of the mount assembly. Accordingly, it is contemplated that embodiments of the invention will comprise two of each of these elements or greater than three of each of these elements.

FIG. 2 shows a mount assembly of the system for mounting electronics shown in FIG. 1, according to an illustrative embodiment of the invention. The collar 11 is cylindrical with an annular cross section and is dimensioned to fit around the electronics housing 10. The collar 11 further comprises a collar flange 111 extending perpendicularly from the bottom of the collar 11. When inserted in the ceiling, the top surface of the collar flange 111 is configured to communicate with the exterior surface of the ceiling. The bottom surface of the collar flange 111 is configured to communicate with the top surface of a flange 101 of the electronics housing 10 (FIG. 3). This configuration provides a flush appearance with the ceiling.

In this embodiment the collar 11 is cylindrical with a uniform annular cross section but the shape of the collar 11 should not be limited to this embodiment. It is contemplated that the cross section may be non-uniform or that the inner or outer shape of the cross section of the collar 11 may be a shape other than a circle, such as octagonal, rectangular, star or any other similar shape. For example, in an embodiment of the invention in which the housing has a rectangular cross section, the inner peripheral surface of the collar 11 may be rectangular, while the outer peripheral surface of the collar 11 may be cylindrical. Additionally, it should be noted that the collar flange 111 need only be flush with the ceiling when the mount assembly is installed in the ceiling. Depending on the shape of the collar 11, the collar flange 111 does not need to extend perpendicularly from the bottom of the collar 11 (FIG. 3). For example, in another embodiment, the collar 11 may have a non-uniform cross section tapering at the top with a collar flange 111 extending at an obtuse angle from the collar 11.

The collar 11 comprises at a first slot 112a, a second slot 112b and a third slot 112c extending from the outer peripheral surface of the collar to an inner peripheral surface of the collar. Each of the at least one slots 112a-c communicates with a corresponding at least one tab 103a-c of the electronics housing 10 to attach the electronics housing 10 to the collar 11. The electronics housing 10 may be detached from the collar 11 by disengaging each tab 103a-c from each corresponding slot 112a-c.

Additionally, the collar 11 comprises three holes 113a-c extending axially from a top surface of the collar 11 to the bottom surface of the collar 11. As described above, the minimum number of holes in the collar is dependent on the number of arms of the mount assembly. In this embodiment, the collar 11 comprises three holes 113a-c but should not be limited to the three holes 113a-c in this embodiment. In other embodiments, the collar 11 comprises any number of holes 113 greater than one and corresponding to the number of arms 12 and threaded screws 13.

Three arms 12a-c are coupled to the collar 11 each at a hinge 126a-c and equidistant from the other arms. In this embodiment, the mount assembly comprises three arms 12a-c but the mount assembly should not be limited to three arms. Embodiments with more than three arms 12a-c and less than three arms 12a-c are contemplated by the invention. In this embodiment, the three arms extend from the indentations 114 in the collar flange 111. Each arm 12a-c is composed of a first portion 121a-c, a second portion 122a-c and a third portion 123a-c, respectively. The first portion 121a-c and the second portion 122a-c meet at a hinge 128a-c and the second portion 122a-c and third portion 123a-c meet at a hinge 127a-c. The first portion 121a-c of each arm 12a-c has a threaded insert 124a-c through the width of the first portion 121a-c extending from the top surface of the portion to the bottom surface of the portion.

In this embodiment, the arms 12a-c are formed from a single piece of nylon having varying thickness, thereby providing rigidity in the first, second and third portions and flexibility at the hinge. However, the arms may be composed of one or more materials. For example, each portion of the arm may be composed of a distinct rigid block, the blocks connected by hinges. Additionally, in an embodiment of the invention, the arms 12a-c and collar 11 are integrally formed from a single piece of material. In this embodiment, the arms 12a-c may be coupled to the collar flange 111 at an indentation in the collar 11 to ensure proper setback from the radial edge of the collar flange.

In an embodiment of the invention, the third portion 123a-c of each arm 12a-c further comprises one or more ribs on an outer surface to provide increased mechanical resistance between the arm 12a-c and the surface of the ceiling.

FIG. 3 shows an electronics housing of the system for mounting electronics shown in FIG. 1, according to an illustrative embodiment of the invention. The electronics housing 10 comprises a cylindrical body and contains components of the electronic device 17. The electronics housing 10 further comprises a housing flange 101 extending from the bottom of the housing. The top surface the electronics housing flange 101 is configured for communicating with a bottom surface of the collar flange 111. The electronics housing 10 further comprises at least three tabs 103a-c, each disposed in a cutout 104a-c of the electronics housing 10 for detachably connecting the electronics housing 10 with the collar 11 by communicating with the three slots 112a-c of the collar 11 (FIG. 2). A slot is formed in the gap between each cutout 104a-c and tab 103a-c. The electronics housing 10 further has three holes 102a-c corresponding to the three holes 113a-c of the collar 11 (FIG. 2). As described above in reference to the collar holes 113, in this embodiment, the housing comprises three holes 113 but should not be limited to three.

In an embodiment of the invention, the electronics housing 10 further comprises a battery compartment 107 defined by an indentation in the outer peripheral surface and configured for receiving one or more electrical power sources 16. For example, the battery case may receive a Lithium Ion (Li-ion) battery providing 4.2 V DC. The electronics housing 10 further comprises a battery cover 105 for the battery compartment 107 and an electrical connection 106 at the bottom of the indentation extending through the electronics housing 10 to electrically couple the electronic components of the electrical device with the one or more electrical power sources 16. In other embodiments of the invention, the electronics housing 10 comprises a hole defined by the outer peripheral surface configured for receiving an electrical conductor for receiving electrical power.

In embodiments of the invention, the electronic device may communicate wired or wirelessly with external devices. For example, in an embodiment of the invention, the electronic device may comprise an RF transceiver for bi-directional communication with an external device. In another embodiment of the invention, the electronic device may be configured for wired communication with an external device, such as via one or more electrical conductors configured for communication received through the opening in the housing.

Each of the three threaded screws 13a-c extends through a corresponding hole 113a-c in the collar 11 and a corresponding threaded insert 124a-c in the first portion 121a-c of the arm 12a-c. The head of each threaded screw 13a-c communicates with the bottom surface of the collar flange 111 and protrudes through a corresponding hole 102a-c of the electronics housing flange 101 providing access to the threaded screw 13a-c for installers. The thread on the screw 13a-c and the thread in the threaded insert 124a-c are configured such that the threaded screw 13a-c may be screwed into the threaded insert 124a-c.

In this embodiment the screws are threaded screws. However, the screws should not be limited to threaded screws. The mount assembly may comprises any screw that is configured for securing the insert to the screw. For example, in an embodiment of the invention, the mount assembly may comprise a ratcheting screw comprising ridges configured for communicating with ridges in a corresponding insert. The ridges on the screw and in the insert are dimensioned to allow the screw to be inserted in one direction through the insert but impede the screw from being pulled through the insert in the opposite direction.

In this illustrative embodiment, the electronics housing 10 houses a passive infrared (PIR) sensor 17. The system further comprises a Fresnel lens 14 and a cap 15. The Fresnel lens 14 is configured to be held in space by the cap 15 and may be protruding through the bottom surface of the cap 15. In an embodiment of the invention, the PIR lens is contained in the electronics housing. In this embodiment, the system further comprises a lens filter. The lens filter may be a flat disc supported in space by the cap 15.

FIG. 4 shows a cap 15 and lens 14 of the system for mounting electronics shown in FIG. 1, according to an illustrative embodiment of the invention. The cap 15 is disc with an extended rim 151. Depending on application, the cap 15 may hold components, such as a lens filter 14, in place or it may serve as a decorative piece. In embodiments of the invention, such as in embodiments when the lens filter 14 is a Fresnel lens, the cap 15 may be an annular disc. The cap 15 further comprises three tabs 152a-c disposed on a top surface of the cap 15 configured for communicating with the three slots formed between each tab 103a-c and each cutout 104a-c of the electronics housing 10. While this embodiment comprises three tabs 152a-c, the cap 15 may comprise at least one tab and should not be limited to three tabs. The cap 15 is dimensioned to communicate with the bottom surface of the electronics housing 10 and cover the electronics housing flange 101 and collar flange 111 thereby providing a more aesthetically pleasing and flush appearance with the ceiling.

FIG. 5a is a bottom view of the system for mounting electronics in an assembled configuration, according to an illustrative embodiment of the invention. FIG. 5b is a top view of the system for mounting electronics in an assembled configuration, according to an illustrative embodiment of the invention. When the system is in an assembled configuration, the housing 10 is inserted into and attached to the collar 11. The at least one tab 103a-c on the housing 10 snaps into the at least one slot 112a-c of the collar 11 to detachably attach the electronics housing 10 to the collar 11. The upper surface of the housing flange 101 communicates with the bottom surface of the collar flange 111. Each hole 102a-c in the housing flange 101 is aligned along the same vertical axis as a corresponding hole 113a-c in the collar 11 and a corresponding threaded insert 124a-c in an arm 12a-c.

In an embodiment of the invention with the cap 15, the tabs 152a-c on the cap 15 snaps into the corresponding slots 112a-c in the collar 11. A top surface of the cap 15 communicates with the bottom surface of the housing flange 101. The extended rim 151 communicates with the exterior surface of the wall. The cap 15 offers an aesthetically pleasing surface and may be easily removed for painting or other adjustments.

FIG. 6 shows the assembled system for mounting electronics in an open position, according to an illustrative embodiment of the invention. FIG. 7 shows the assembled system for mounting electronics in a partially closed position, according to an illustrative embodiment of the invention. When in an open position, the arm angle 125a-c between the second portion 122a-c and third portion 123a-c of each arm 12a-c is less acute than in a closed position and provides a minimal horizontal profile for inserting into an opening in the ceiling. For each arm 12a-c, as its corresponding screw 13a-c is turned in a first direction the first portion 121a-c of the arm 12a-c is lowered along the length of the screw 13a-c thereby transitioning the arm angle 125a-c between the first portion 121a-c and the second portion 122a-c from obtuse to acute. As the arm 12a-c progresses lower along the length of the screw 13a-c, the arm angle 125a-c becomes more acute and the magnitude of the angle degree decreases. Advantageously, each arm 12a-c is configured to be independently compressed with respect to the other arms. Depending on the opening dimensions and ceiling thickness, each arm 12a-c may be closed to any desired angle degree from fully open to fully closed. As described below, this allows for each arm 12a-c to be set at different arm angle 125a-c to account for varying thickness of the ceiling, interior impedances like joists and studs and oversized openings in the ceiling.

FIG. 8 is a side view of the assembled system for mounting electronics installed in a ceiling, according to an illustrative embodiment of the invention. The collar 11 with the attached housing 10 is inserted into the opening in the ceiling 50. The top surface of the collar flange 111 is flush with the exterior surface 501 of the ceiling. Each of the arms 12a-c is compressed to a suitable arm angle 125a-c to engage an inner surface of the ceiling (i.e. the inner peripheral surface 503 of the opening or interior 502 surface of the ceiling 50) and provide sufficient mechanical resistance to support the collar 11 and electronics housing 10. Advantageously, each arm 12a-c is engaged independently and may be compressed to individual angles 125a-c to allow for unique conditions in the ceiling 50 as will be described below.

FIG. 9 is a side view of the assembled system for mounting electronics installed in a ceiling with variable width, according to an illustrative embodiment of the invention. The width 62 of the portion of the ceiling 50 contiguous to the first arm 12a is wider than the width 61 of the portion of the ceiling 50 contiguous to the second arm 12b. Accordingly, the second arm 12b is compressed further than the first arm 12a as evidenced by the first portion 121b of the second arm 12b being closer to the ceiling 50 than the first portion 121a of the first arm 12a, as well as the arm angle 125b of the second arm 12b being more acute than the arm angle 125a of the first arm 12a.

FIG. 10 is a side view of the assembled system for mounting electronics installed in a ceiling with an irregular opening, according to an embodiment of the invention. In this exemplary installation, the ceiling 50 has an irregular opening for the mounting assembly. Accordingly, the length 1002 between the first arm 12a and the peripheral surface 503 of the ceiling 50 is greater than the length 1001 between the second arm 12b and the peripheral surface 503 of the ceiling 50. The first arm 12a is compressed further than the second arm 12b as evidenced by the first portion 121a of the first arm 12a being closer to the ceiling 50 than the first portion 121b of the second arm 12b as well as the arm angle 125a of the first arm 12a being more acute than the arm angle 125b of the second arm 12b.

FIG. 11 is a side view of the assembled system for mounting electronics installed in a ceiling with a nearby wall joist, according to an illustrative embodiment of the invention. In this exemplary installation, the opening in the ceiling is near an impediment, such as a beam, joist or stud. The impediment 504 does not allow the first arm 12a to compress enough to engage the peripheral surface 503 of the ceiling 50. Accordingly, the first arm 12a is compressed until it engages the impediment 504, thereby providing suitable supporting friction. The first arm 12a does not need to be compressed as much as the second arm 12b to engage the impediment 504. Accordingly, the arm angle 125a of the first arm 12a is greater than the arm angle 125b of the second arm 12b.

FIG. 12 is a flowchart illustrating a method for mounting electronics in a wall, according to an embodiment of the invention. In step 1201, a first threaded screw 13a is inserted through a first hole 113a in a collar 11 and a threaded insert 124a in a first arm 12a coupled to the collar 11.

In step 1202, at least a second threaded screw 13b is inserted through a second hole 113b in the collar 11 and threaded insert 124b in a second arm 12b coupled to the collar 11. In this embodiment, the method comprises the steps of engaging two arms to the mounting surface. However, the invention should not be limited to two arms. In a further embodiment of the invention, the method comprises the step 1203 of aligning the electronic housing 10 with collar 11.

In step 1204, the electronics housing 10 is detachably connected to the collar 11 by inserting the electronics housing 10 in the collar 11.

In step 1205, the collar 11 is inserted in an opening of the wall.

In step 1206, the first arm 12a is compressed to a first desired arm angle 125a by rotating the first threaded screw 13a thereby engaging the opening of the wall.

In step 1207, at least a second arm 12b is compressed to a second desired arm angle 125b by rotating the second threaded screw 12b thereby engaging the opening of the wall. As noted above, in this embodiment, the method comprises steps for compressing at least two arms. The method should not be limited to two arms. In a further embodiment of the invention, the method comprises a step for compressing a third arm 12c to a third desired arm angle 125c by rotating a third threaded screw 13c thereby engaging the opening of the wall.

In a further embodiment of the invention, the method further comprises the steps of inserting a Fresnel lens 14 in a cap 15 (step 1208) and detachably connecting the cap 15 to the electronics housing 10 by inserting the cap 15 into the electronics housing 10 (step 1209).

In another embodiment of the invention, the method further comprises the step of aligning the electronic housing 10 with the collar 11 by aligning one or more holes 102a-c in a flange 101 of the electronics housing 10 with one or more holes 113a-c in the collar 11 (step 1203).

INDUSTRIAL APPLICABILITY

To solve the aforementioned problems, the present invention is a unique device in which a mounting assembly utilizes at least two independently controlled arms to support an electronic device in a ceiling.

List of Acronyms Used in the Detailed Description
of the Invention

The following is a list of the acronyms used in the specification in alphabetical order.
DC direct current
Li-ion lithium ion
PIR passive infrared
V Volts Alternate Embodiments Alternate embodiments may be devised without departing from the spirit or the scope of the invention. For example, the body of the mount housing and collar opening may be a shape other than cylindrical, such as octagonal or rectangular.

What is claimed is:

1. A system for mounting electronics in a wall, the system comprising:
    an electronics housing;
    a collar dimensioned to fit around and detachably connect to the electronics housing; and
    at least two arms coupled to the collar at a hinge to support the collar in the wall by being compressibly engaged with an inner surface of the wall, each of the at least two arms comprising:
        a first portion comprising a threaded insert extending from a top surface of the first portion to a bottom surface of the first portion, the threaded insert receiving a threaded screw,
        a second portion meeting the first portion at a hinge, and
        a third portion meeting the second portion at a hinge, wherein the second and third portions meet at an angle,
        wherein rotation of the threaded screw in a first direction translates the first portion along a length of the threaded screw and compresses the arm by decreasing the angle between the second and third portions, thereby compressibly engaging the arm with the inner surface of the wall.

2. The system of claim 1 wherein the collar further comprises a slot extending from an outer peripheral wall to an inner peripheral wall of the collar and the electronics housing further comprises a tab configured for communicating with the slot of the collar for detachably connecting the electronics housing to the collar.

3. The system of claim 1 wherein the electronics housing further comprises a housing flange extending from a bottom of the electronics housing, and the collar further comprises a collar flange extending from a bottom of the collar, wherein a top surface of the collar flange configured for communicating with an exterior surface of the wall and a bottom surface of the flange communicates with a top surface of the collar flange.

4. The system of claim 1 further comprising a cap configured for detachably connecting to the housing and further configured for covering the opening in the wall.

5. The system of claim 4 wherein the cap comprises a disc with a raised edge and at least one tab.

6. The system of claim 1 wherein the electronics is a passive infrared (PIR) sensor.

7. The system of claim 6 wherein the PIR sensor is configured for wireless communication.

8. The system of claim 6 wherein the PIR sensor is battery powered.

9. The system of claim 6 wherein the PIR sensor further comprises a wired interface and wherein the top surface of the housing comprises an opening configured for receiving a wire.

10. The system of claim 6 further comprising a PIR lens filter.

11. The system of claim 10 wherein the PIR lens filter is a flat disc.

12. The system of claim 6 further comprising a Fresnel lens wherein a portion of the lens extends beyond a bottom surface of the cap.

13. The system of claim 1, wherein rotation of the threaded screw in a second direction translates the first portion along the length of the threaded screw and decompresses the arm by increasing the angle between the second and third portions.

14. The system of claim 1, wherein the wall comprises at least one selected from the group consisting of a planar board, a portion of a ceiling, a portion of a floor, a portion of a side wall, a table top, a desk top, a wooden beam, a panel sheetrock, and a plaster.

15. The system of claim 1, wherein the collar comprises at least two holes, each receiving a first end of the threaded screw, and wherein the threaded insert of the first portion receives a second end of the threaded screw.

16. The system of claim 1, wherein the wall contiguous to the collar has a varying width, varying distance to the collar, or comprises a joint, a beam, a joist, or a stud.

17. The system of claim 5, wherein the electronics housing comprises at least one slot and wherein the at least one tab of the cap communicates with the at least one slot of the electronics housing.

18. The system of claim 1, wherein each arm of the at least two arms compresses and decompresses to individual angles independently of the other arm.

19. A system for mounting electronics in a wall, the system comprising:
   an electronics housing;
   a collar dimensioned to fit around and detachably connect to the electronics housing; and
   at least two arms coupled to the collar to support the collar in the wall by being compressibly engaged with an inner surface of the wall, each of the at least two arms comprising:
      a first portion comprising a threaded insert extending from a top surface of the first portion to a bottom surface of the first portion, the threaded insert receiving a threaded screw,
      a second portion comprising (a) a first end connected to the first portion at a first hinge, and (b) a second end, and
      a third portion comprising (a) a first end connected to the second end of the second portion at a second hinge, and (b) a second end connected to the collar at a third hinge, wherein the second and third portions meet at an angle,
      wherein rotation of the threaded screw in a first direction translates the first portion along a length of the threaded screw and compresses the arm by decreasing the angle between the second and third portions, thereby compressibly engaging the arm with the inner surface of the wall.

20. A system for mounting electronics in a wall, the system comprising:
   an electronics housing;
   at least two arms connected to the electronic housing to support the electronics housing in the wall by being compressibly engaged with an inner surface of the wall, each of the at least two arms comprising:
      a first portion comprising a threaded insert extending from a top surface of the first portion to a bottom surface of the first portion, the threaded insert receiving a threaded screw,
      a second portion comprising (a) a first end connected to the first portion at a first hinge, and (b) a second end, and
      a third portion comprising (a) a first end connected to the second end of the second portion by a second hinge, and (b) a second end that meets the electronics housing at a third hinge, wherein the second and third portions meet at an angle,
      wherein rotation of the threaded screw in a first direction translates the first portion along a length of the threaded screw and compresses the arm by decreasing the angle between the second and third portions, thereby compressibly engaging the arm with the inner surface of the wall.

* * * * *